(12) United States Patent
Yarosh et al.

(10) Patent No.: US 9,122,344 B2
(45) Date of Patent: Sep. 1, 2015

(54) METHOD AND APPARATUS FOR PARALLEL SCANNING AND DATA PROCESSING FOR TOUCH SENSE ARRAYS

(71) Applicant: Cypress Semiconductor Corporation, San Jose, CA (US)

(72) Inventors: Andriy Yarosh, Moguliv-Podilskiy (UA); Roman Ogirko, Lviv (UA); Oleksandr Pirogov, Lviv (UA); Victor Kremin, Lviv (UA); Roman Sharamaga, Lviv (UA); Anton Konovalov, Khmelnitsky (UA); Andriy Maharyta, Lviv (UA); Haneef Mohammed, Beaverton, OR (US)

( * ) Notice: Subject to any disclaimer, the term of this patent is extended or adjusted under 35 U.S.C. 154(b) by 11 days.

(21) Appl. No.: 13/940,516

(22) Filed: Jul. 12, 2013

(65) Prior Publication Data

US 2014/0118296 A1    May 1, 2014

Related U.S. Application Data

(63) Continuation of application No. 13/247,550, filed on Sep. 28, 2011, now Pat. No. 8,487,909.

(60) Provisional application No. 61/512,358, filed on Jul. 27, 2011.

(51) Int. Cl.
  *G06F 3/044*  (2006.01)
  *G06F 3/041*  (2006.01)
  *G06F 9/38*   (2006.01)

(52) U.S. Cl.
  CPC ............ *G06F 3/0416* (2013.01); *G06F 9/3851* (2013.01)

(58) Field of Classification Search
  CPC ....... G06F 3/041; G06F 3/0416; G06F 3/044; G06F 9/3851
  See application file for complete search history.

(56) References Cited

U.S. PATENT DOCUMENTS

| | | | |
|---|---|---|---|
| 4,888,795 | A | 12/1989 | Ando et al. |
| 6,856,259 | B1 | 2/2005 | Sharp |
| 7,812,827 | B2 | 10/2010 | Hotelling et al. |
| 7,831,070 | B1 | 11/2010 | Cheng et al. |
| 8,040,142 | B1 | 10/2011 | Bokma et al. |
| 8,135,884 | B1 | 3/2012 | Sullam et al. |
| 8,154,310 | B1 | 4/2012 | Maharyta et al. |
| 8,212,159 | B2 | 7/2012 | Stewart |
| 8,395,715 | B2 | 3/2013 | Yu et al. |
| 8,665,231 | B2 * | 3/2014 | Edwards et al. ............. 345/173 |
| 8,810,543 | B1 | 8/2014 | Kurikawa |
| 2002/0163493 | A1 | 11/2002 | Matsushima et al. |
| 2003/0063073 | A1 * | 4/2003 | Geaghan et al. ............ 345/173 |

(Continued)

OTHER PUBLICATIONS

U.S. Appl. No. 13/341,285: "Method And Apparatus For Pipelined Conversions In Touch Sensing Systems" Edward L. Grivna et al., filed on Dec. 30, 2011; 30 pages.

(Continued)

*Primary Examiner* — Joe H Cheng

(57) ABSTRACT

Methods and apparatus include receiving a current set of measurements of a touch sense array using a first functional block of a processing device and processing the current set of measurements using a second functional block to render a touch map corresponding to the touch sense array. The methods and apparatus include performing the next set of measurements using the first functional block. Performing the next set of measurements and processing the current set of measurement are performed substantially concurrently.

20 Claims, 6 Drawing Sheets

(56) References Cited

U.S. PATENT DOCUMENTS

| | | |
|---|---|---|
| 2007/0229470 A1 | 10/2007 | Snyder et al. |
| 2007/0273560 A1 | 11/2007 | Hua et al. |
| 2008/0062148 A1 | 3/2008 | Hotelling et al. |
| 2008/0074357 A1 | 3/2008 | Kanda |
| 2008/0111714 A1 | 5/2008 | Kremin |
| 2008/0150905 A1 | 6/2008 | Grivna et al. |
| 2008/0150906 A1 | 6/2008 | Grivna |
| 2008/0158167 A1 | 7/2008 | Hotelling et al. |
| 2008/0158177 A1 | 7/2008 | Wilson et al. |
| 2008/0162751 A1 | 7/2008 | Wilson |
| 2008/0162996 A1 | 7/2008 | Krah et al. |
| 2008/0179112 A1 | 7/2008 | Qin et al. |
| 2008/0246723 A1 | 10/2008 | Baumbach |
| 2008/0258759 A1 | 10/2008 | Snyder et al. |
| 2008/0258760 A1 | 10/2008 | Sullam et al. |
| 2008/0277171 A1 | 11/2008 | Wright |
| 2009/0045822 A1 | 2/2009 | Nosovitsky et al. |
| 2009/0058829 A1 | 3/2009 | Kim et al. |
| 2009/0166097 A1* | 7/2009 | Chang .................. 178/18.03 |
| 2009/0174675 A1* | 7/2009 | Gillespie et al. ............. 345/173 |
| 2009/0265670 A1 | 10/2009 | Kim et al. |
| 2009/0322410 A1 | 12/2009 | David et al. |
| 2010/0026666 A1 | 2/2010 | Ho |
| 2010/0039396 A1 | 2/2010 | Ho et al. |
| 2010/0059295 A1* | 3/2010 | Hotelling et al. .......... 178/18.06 |
| 2010/0060590 A1 | 3/2010 | Wilson et al. |
| 2010/0060593 A1 | 3/2010 | Krah |
| 2010/0149126 A1 | 6/2010 | Futter |
| 2010/0200310 A1 | 8/2010 | Yeh et al. |
| 2010/0265200 A1 | 10/2010 | Cho et al. |
| 2010/0295813 A1 | 11/2010 | Kent |
| 2010/0300773 A1 | 12/2010 | Cordeiro et al. |
| 2011/0043478 A1* | 2/2011 | Matsushima ................. 345/174 |
| 2011/0147101 A1 | 6/2011 | Bateman et al. |
| 2011/0163992 A1 | 7/2011 | Cordeiro et al. |
| 2013/0018489 A1* | 1/2013 | Grunthaner et al. ............ 700/73 |

OTHER PUBLICATIONS

International Search Report/Written Opinion for Application No. PCT/US2011/053668, dated Jul. 2, 2012; 8 pages.

USPTO Notice of Allowance for U.S. Appl. No. 13/247,550 dated Apr. 29, 2013; 10 pages.

USPTO Notice of Allowance for U.S. Appl. No. 13/247,550 dated May 31, 2013; 6 pages.

Analog Devices, "Analog Dialogue", vol. 40, dated Nov. 4, 2006; http://www.analog.com/library/analogdialogue/cd/vol40n4.pdf; 16 pages.

CSD User Module Data Sheet, Cypress Semiconductor Corporation CSD v 1.0, Oct. 23, 2006; 58 pages.

ECE 477 Final Report, "Multi-Touch Controller", Purdue, dated Fall 2008 ; 106 pages.

Septimiu Crisan, "A Multi-Touch Collaborative Solution for Measurement Data Visualisation", XIX IMEKO World Congress, Fundamental and Applied Metrology, Sep. 6-11, 2009; 4 pages.

Silicon Labs, "Sensing Multiple Channels in a Single Conversion; Low Power Capacitive Sensing", Rev 0.2, 2013; 7 pages https://www.silabs.com/Support%20Documents/TechnicalDocs/AN507.pdf.

USPTO Non-Final Rejection for U.S. Appl. No. 13/341,285 dated Nov. 6, 2014; 20 pages.

USPTO Final Rejection for U.S. Appl. No. 13/341,285 dated Apr. 9, 2015; 22 pages.

\* cited by examiner

METHOD AND APPARATUS FOR PARALLEL SCANNING AND DATA PROCESSING FOR TOUCH SENSE ARRAYS

RELATED APPLICATIONS

This application is a continuation of U.S. patent application Ser. No. 13/247,550, filed Sep. 28, 2011, now U.S. Pat. No. 8,487,9098 B2, which claims the benefit of U.S. Provisional Application No. 61/512,358, filed on Jul. 27, 2011, all of which are hereby incorporated by reference in their entirety.

TECHNICAL FIELD

The present invention relates generally to capacitive touch sense arrays, and more particularly, to parallel scanning and data processing for touch sense arrays.

BACKGROUND

Touch screens are the growing trend for input devices to a wide range of computing devices, especially smart phones. A certain class of touch sense arrays includes a two-dimensional array of capacitors, referred to as sense elements. Touch sense arrays can be scanned in several ways, one of which (mutual-capacitance sensing) permits individual capacitive elements to be measured. Another method (self-capacitance sensing) can measure an entire sensor strip, or even an entire sensor array, with less information about a specific location, but performed with a single read operation.

The two-dimensional array of capacitors, when placed in close proximity, provides a means for sensing touch. A conductive object, such as a finger or a stylus, coming in close proximity to the touch sense array causes changes in the capacitances of the sense elements in proximity to the conductive object. More particularly, when a finger touch occurs, self capacitance increases whereas mutual capacitance decreases. These changes in capacitance can be measured to produce a "two-dimensional map" that indicates where the touch on the array has occurred.

One way to measure such capacitance changes is to form a circuit comprising a signal driver (e.g., an AC current or a voltage source) which is applied to each horizontally aligned conductor in a multiplexed fashion. The charge associated with each of the capacitive intersections is sensed and similarly scanned at each of the vertically aligned electrodes in synchronization with the applied current/voltage source. This charge is then measured using a slot-by-slot touch sense controller that typically includes a form of charge-to-voltage converter, followed by a multiplexor of sense electrodes and A/D converter that is interfaced with a CPU to convert the input signal to digital form for input to a processor. The processor, in turn, renders the "two-dimensional map" or "touch map" and determines the location of a touch. A full slot-by-slot scan of each of the slots is performed before the resulting data is processed by the CPU in a serial fashion.

Current smart phones and tablet computers require such features as gesture, fat finger, and finger identifier (ID) sensing, as well as operating system (OS) support, fast performance, high signal-to-noise ratio (SNR), and high resolution at a low price. Conventional serial scanning and processing techniques implemented in touch sense controllers are inadequate.

BRIEF DESCRIPTION OF THE DRAWINGS

Embodiments of the present invention will be more readily understood from the detailed description of exemplary embodiments presented below considered in conjunction with the attached drawings in which like reference numerals refer to similar elements and in which.

DETAILED DESCRIPTION

A parallel pipelining method of operation of a touch sense controller for processing data into a touch map is disclosed. The touch sense controller includes a sequencer configured to receive a current full scan of response signals to excitation of a sense array using a first thread (e.g., hardware scan loop thread 402 of FIG. 4) and configured to receive a next full scan of response signals using the first thread. The touch sense controller further includes processing logic configured to process the current full scan of response signals using a second thread (e.g., digital filter block (DFB) data processing loop 408 of FIG. 4) to render a touch map corresponding to the touch sense array. Receiving the next full scan and processing the current full scan are performed substantially simultaneously.

In an embodiment, the first thread may be a hardware scan thread of the sequencer and is not part of a central processing unit (CPU). The second thread may a hardware thread of a digital filter block (DFB) and is not part of a CPU or it may be a software thread of a CPU.

In an embodiment, the touch sense controller may include a CPU configured to initiate processing the current full scan in response to an interrupt corresponding to completion of receiving the current full scan from the sequencer. The CPU may also be configured to initiate processing the next full scan in response to an interrupt corresponding to completion of receiving the current full scan from the sequencer.

In an embodiment, the touch sense controller may further include a memory and a direct memory access (DMA) controller coupled to the memory and the sequencer. The DMA controller may be configured to transfer data corresponding to individual response signals of the current or next full scan of response signals to corresponding single buffers in the memory. The DMA controller may further configured to combine the single buffers into a full sense array raw data buffer in order of slots in the memory.

Possible advantages of employing the above method may include avoiding numerous CPU dead time intervals and pipeline switching code used in conventional pipelining touch screen controllers and method of operation. The CPU is released to perform advanced service and communication functions in sharp contrast to conventional solutions that are prone to drain corresponding CPU resources.

In an embodiment, a touch sense array having more sensors than conventional touch sense arrays may be interfaced to the touch sense controller which is capable of processing the data with the same refresh time as for conventional designs. This architecture may be configured to implement multi-TX scanning with long sequences. As a result, SNR increases by 2-4 times over conventional designs.

Figure 1:
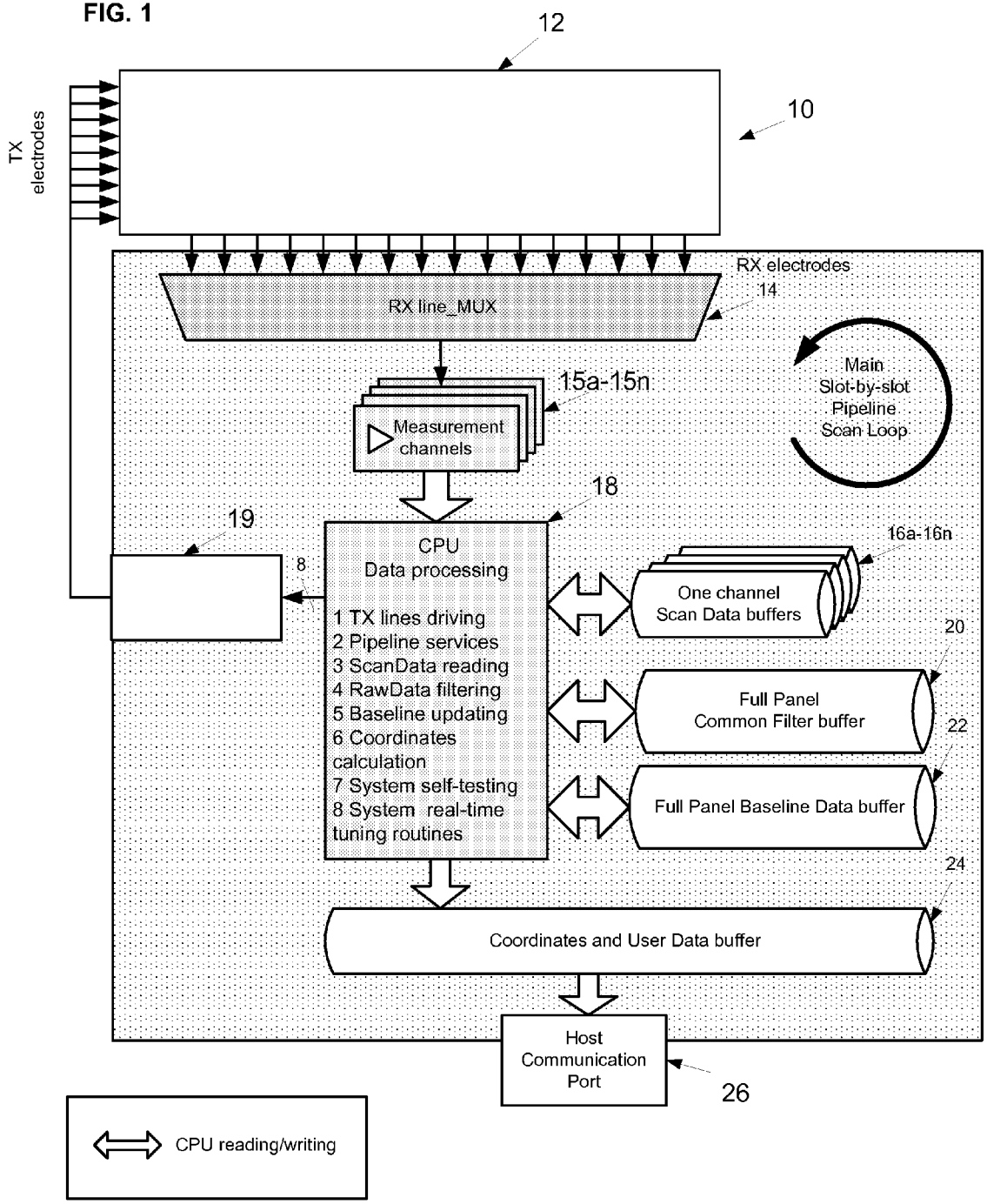
FIG. 1 depicts a conventional slot-by-slot touch sense controller for detecting a response signal of a touch sense array.

FIG. 1 depicts conventional slot-by-slot touch sense controller 10 for detecting a response signal of a touch sense array 12. The touch sense controller 10 includes a receiving multiplexor 14 for selecting each of the RX lines to be measured from the touch sense array 12. Each measured signal is digitized and placed into individual measurement channels 15a-15n to be processed by a central processing unit (CPU) 18. The duties of the CPU 18 included TX lines driving (via TX line driver hardware 19), pipeline services, scan data reading, raw received data filtering, baseline capacitance updating, coordination of all calculations, system self-testing, and system real-time tuning routines. The CPU 18, in turn, writes raw digitized data from the individual measurement channels 15a-15n to corresponding individual scan data buffers 16a-16n. The CPU 18 writes/reads to/from a full sense array common filter buffer 20, a full sense array baseline data buffer 22, and a map coordinates and user data buffer 24. The latter is fed to a host communication port 26.

Figure 2:
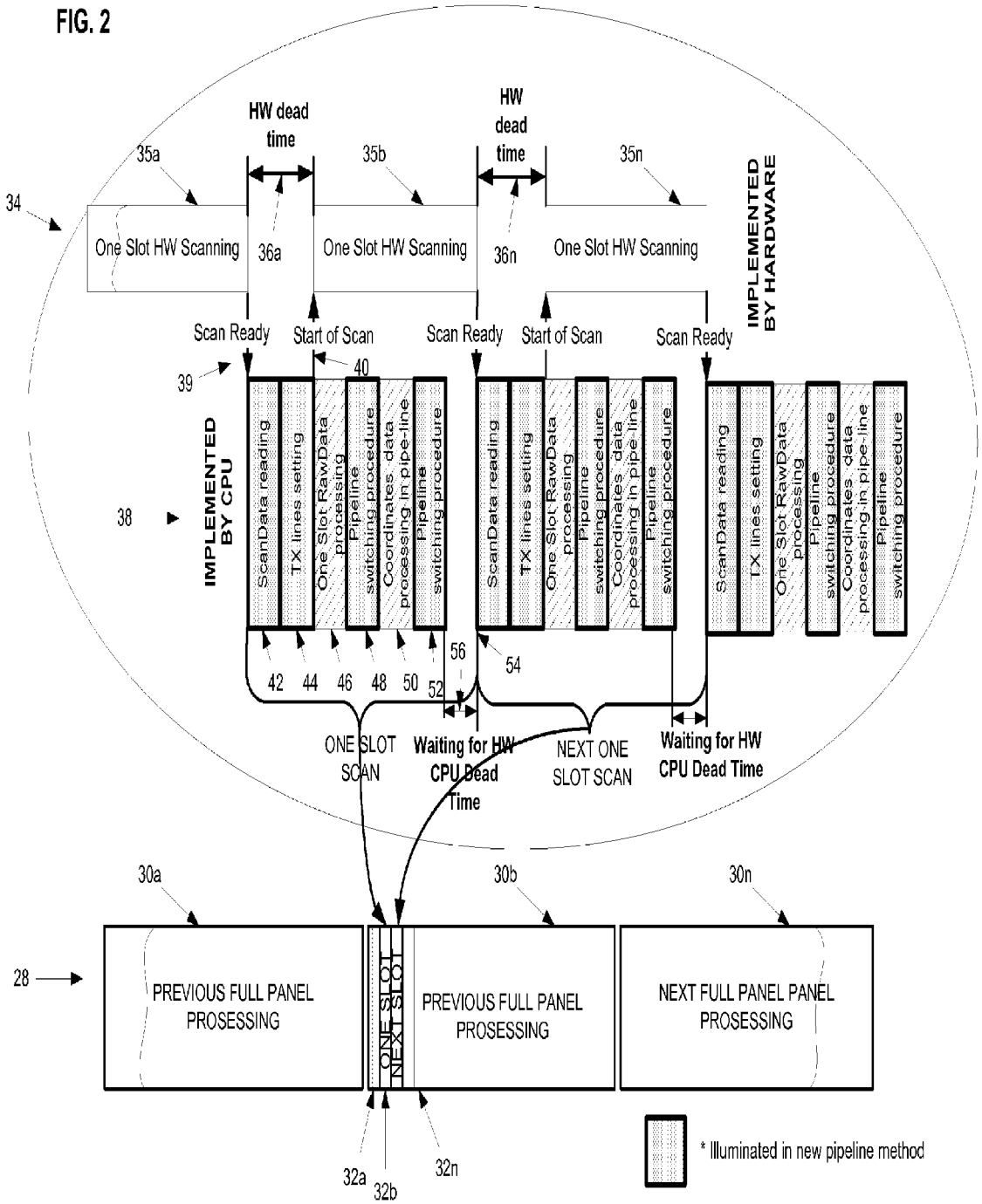
FIG. 2 depicts a timeline for a conventional slot-by-slot pipelining method for processing data into a touch map by the touch sense controller of FIG. 1.

FIG. 2 depicts a timeline for a conventional slot-by-slot pipelining method for processing data into a touch map by the touch sense controller 10 of FIG. 1 to improve performance over the serial method of processing described above. All data flow, all hardware control, and all system management in this architecture are provided by CPU data processing and 'register to memory' or 'memory to memory' reading/writing. The lower portion 28 of FIG. 2 shows multiple full sense array scans and processing blocks 30a-30n on a "large" time scale. Each of the processing blocks 30a-30n is divided into processing time intervals/slots 32a-32n of CPU processing time. A slot 32a is the time for processing one portion of scanned data. A single slot 32a may permit scanning and processing of one sensor, one row of sensors, or one column of sensors for each of the measurement channels. The elapsed time of one slot 32a is typically very short—on the order of a hundred microseconds to a couple of milliseconds. System performance is limited because scanning and data processing is synchronized and divided according to quantities of a slot.

The upper portion 34 of FIG. 2 illustrates intervals of time for the touch screen controller 10 to perform individual hardware scans of the touch sense array 12. Hardware scan intervals 35a-35n of a single slot are separated, i.e., delayed by hardware "dead time" intervals 36a-36n. The central portion 38 of FIG. 2 illustrates time intervals for the CPU 18 to process data from the hardware scan intervals 35a-35n. Though a scan may be ready to be performed at time 39, the scan does not actually begin until a scan start time 40. A hardware dead time interval 36a includes a time interval 42 needed by the CPU 18 to perform a single slot scan data reading. The hardware dead time interval 36a further includes a setting time 44 of the next TX signal value. The interval 46 includes the time needed for the CPU 18 to process raw read data, followed by a first pipeline switching procedure time interval 48. During an interval 50, data in the pipelines are coordinated, followed by a second pipeline switching procedure time interval 52. Since the hardware cannot begin performing a scan of the next slot 32b until time 54 and visa versa, there therefore exists an unavoidable combined "waiting for hardware" CPU dead time interval 56, which reduces efficiency.

Referring now to FIGS. 1 and 2, more particularly, in the slot-by-slot pipelining method of FIG. 2, time flow and data flow management are provided by a pipeline switching procedure (code). If one slot scan is completed, the CPU 18 reads the scan data, pre-processes it, and moves it to a scan data buffer 16a. The CPU 18 then switches TX lines to a new state and generates the next scan start time 40. During the first and second pipeline switching procedure time intervals 48, 52, the CPU 18 may process a portion of common data. Common data processing includes a baseline compensation calculations, centroid coordinates calculations, a finger ID determination, etc. The time permitted for their processing is limited to one slot scan time. Therefore, only a small portion of common data may be processed. As a result, each of the pipeline switching procedures may execute each function or algorithm according to its time budget within a slot 32a. After the time of a slot 32a expires, the CPU 18 switches to a next slot 32b. As a result, pipeline code is complex. Pipeline data processing works well only with short regular portions of data, and only if CPU processing time is the shorter than slot hardware scanning time. Further, as illustrated in FIG. 2, there are many dead-time intervals (e.g., 36a, 56) in hardware time flow and CPU time flow.

Figure 3:
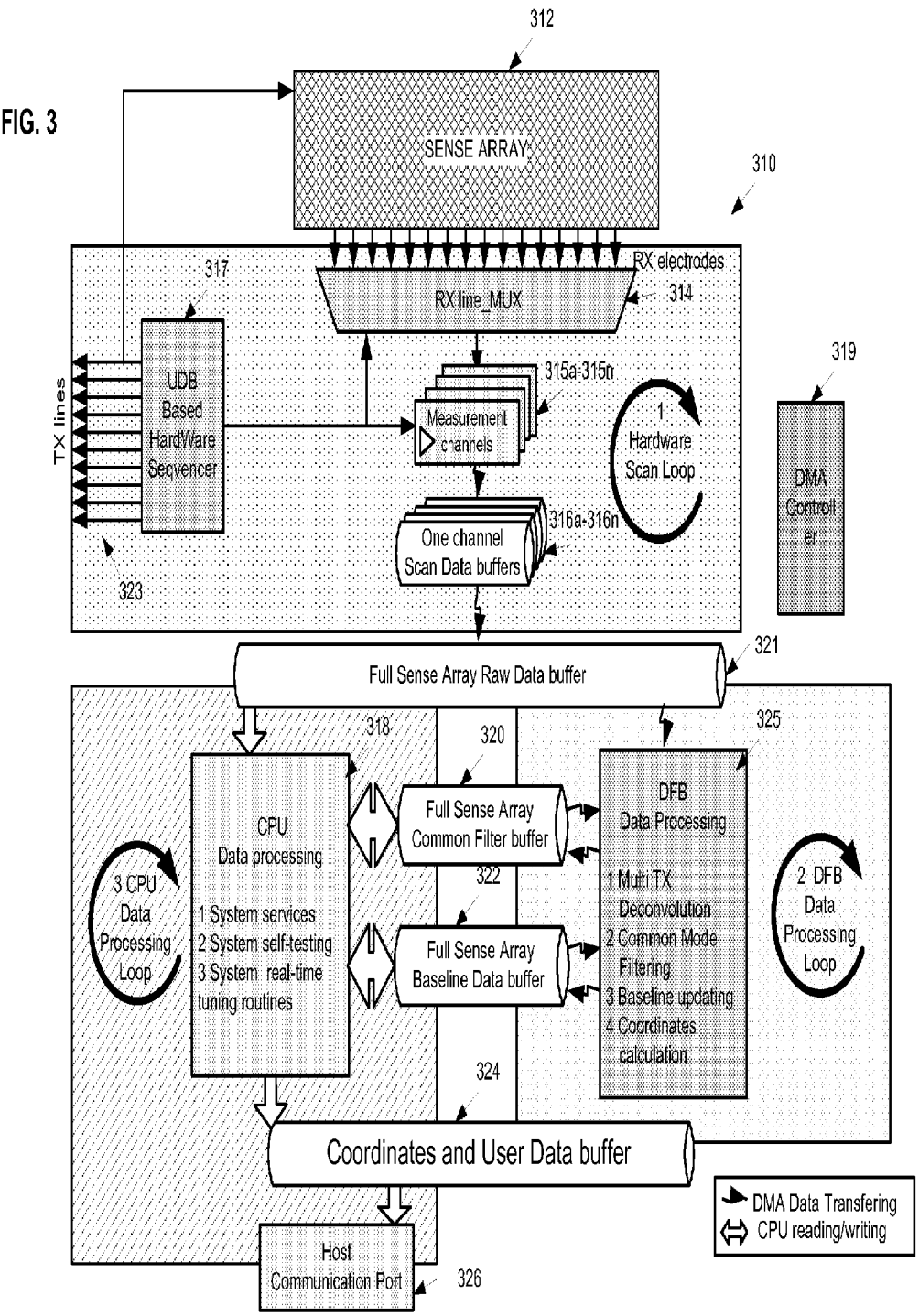
FIG. 3 is a block diagram of one embodiment of a parallel pipelining touch sense controller for detecting response signals of a touch sense array.

FIG. 3 depicts an embodiment of a parallel pipelining touch sense controller 310 for detecting response signals of a touch sense array 312. The touch sense controller 310 includes a receiving multiplexor 314 for selecting each of the RX lines to be measured from the touch sense array 312. Each measured signal is digitized and placed into individual measurement channels/slots 315a-315n under the control of a system sequencer 317. The system sequencer 317 is configured to instruct a DMA controller 319 to transfer raw data from each of the measurement channels 315a-315n to corresponding individual scan data buffers 316a-316n in a memory (not shown). The system sequencer 317 is further configured to instruct the DMA controller 319 to transfer data in sequence in the scan data buffers 316a-316n to a full sense array raw data buffer 321. The system sequencer is further configured to provide driving signals 323 to be applied to the TX lines.

The content of the full sense array raw data buffer 321 is configured to be transferred and processed substantially simultaneously by both a central processing unit (CPU) 318 and a digital filter block (DFB) 325, respectively. The duties of the CPU 318 include only pipeline services, system self-testing, and system real-time tuning routines. The remainder of the duties formerly carried out by the CPU 18 of FIG. 1 is now performed by processing logic. In an embodiment, processing logic may include the DFB 325. In another embodiment, processing logic may include the system sequencer 317 (i.e., providing TX signals) and the DFB 325 (e.g., scan data reading, raw received data filtering, baseline capacitance updating, and coordination of all calculations). The CPU 318 jointly with the DFB 325, writes/reads to/from a full sense array common filter buffer 320, a full sense array baseline data buffer 322, and a map coordinates and user data buffer 324. The latter is fed to a host communication port 326. In another embodiment, the processing logic may include the DFB 325, the system sequencer 317, the DMA controller 319, and the buffers 316a-316n, 320, 321, 322, and 324.

The system sequencer 317, the CPU 318, and the DFB 325 (collectively the "processing device") may reside on a common carrier substrate such as, for example, an integrated circuit ("IC") die substrate, a multi-chip module substrate, or the like. Alternatively, the components of processing device may be one or more separate integrated circuits and/or discrete components. In one exemplary embodiment, the processing device is the Programmable System on a Chip ("PSoC®") processing device, manufactured by Cypress Semiconductor Corporation, San Jose, Calif. Alternatively, the processing device may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of the processing device coupled to a host, but may include a system that measures the capacitance on the touch sense array 312 and sends the raw data to a host computer where it is analyzed by an application program. In effect the processing that is done by the processing device may also be done in the host. The host may be a microprocessor, for example, as well as other types of processing devices as would be appreciated by one of ordinary skill in the art having the benefit of this disclosure.

The components of the system 310 may be integrated into the IC of the processing device, or alternatively, in a separate IC. Alternatively, descriptions of the system 310 may be generated and compiled for incorporation into other integrated circuits. For example, behavioral level code describing the system 310, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe the system 310.

It should be noted that the components of the system 310 may include all the components described above. Alternatively, the system 310 may include only some of the components described above.

In one embodiment, the system 310 is used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, a GPS device, or a control sense array.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Figure 4:
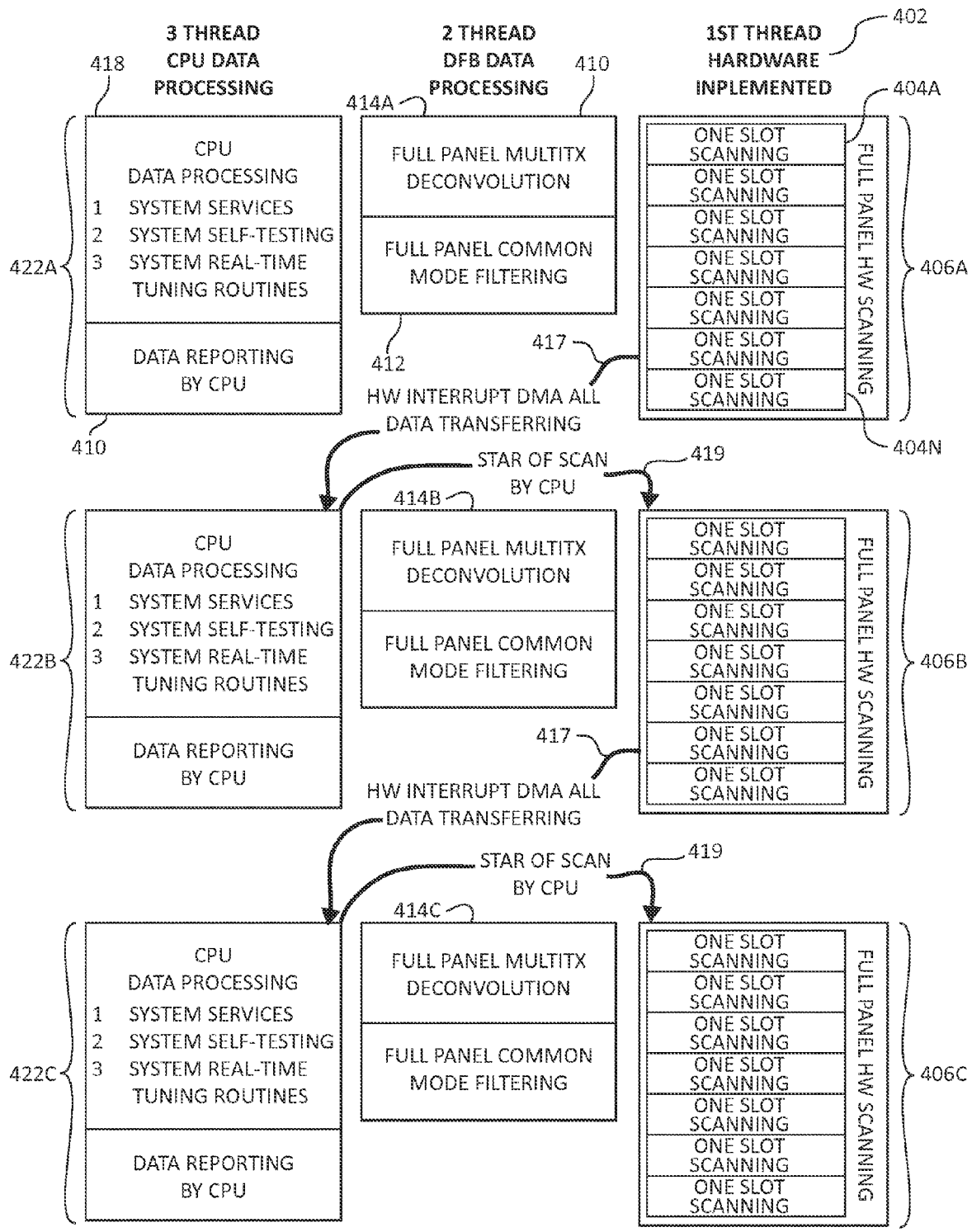
FIG. 4 depicts a timeline of an embodiment of a method for processing data into a touch map by the parallel pipelining touch sense controller of FIG. 3.

FIG. 4 depicts a timeline of an embodiment of a method for processing data into a touch map by the parallel pipelining touch sense controller 310 of FIG. 3 to improve performance over the slot-by-slot pipelining method of FIG. 2. The new method uses a different time scale. Instead of scanning on a per slot basis, a full sense array scanning time scale unit is employed, which comprises a full set of measurements from all slots. Three independent parallel execution threads 402, 408, 416 (see FIG. 4) provide full sense array scanning and full data processing in a single long uninterruptible time unit. In one embodiment, hardware scanning, multi-TX driving, and the system sequencer 317, may be implemented in universal digital blocks (UDB). The measured data is read "on-the-fly" by the DMA controller 319 from each of the measurement channels 315a-315n to one channel scan data buffers 316a-316n without any usage of the CPU 318. The CPU 318 is used primarily for advanced service and communication functions, such as system configuration and some short-time system services (DFB and DMA loading). The CPU is not used for data moving and main data processing.

Returning now to FIGS. 3 and 4, a first thread 402, implemented in hardware (i.e., UDBs), performs a full scan of response signals (i.e., a full sense array hardware scan of slots 404a-404n) to at least one transmit signal of the touch sense array 312 in total time intervals 406a-406c. A second thread 408 is executed by the DFB 325 to process data from the full sense array hardware scan of slots 404a-404n, which, in an embodiment, may include at least a full sense array multi-TX deconvolution in a time interval 410, full sense array common mode filtering in a time interval 412, and touch map rendering (not shown) in total time intervals 414a-414c. The second thread may be implemented either in hardware or in software. A third thread 416 is executed in software by the CPU 318 to perform higher level data processing in a time interval 418 and data reporting of the touch map in the time interval of total time intervals 422a-422c rendered by the DFB thread 408.

Note that, on completion of a current full sense array hardware scan total time interval 414, a hardware interrupt or semaphore 417 is generated to indicate to the CPU 318 that the DMA controller 319 has completed transfer of slot data from each of the measurement channels 315a-315n to the one channel scan data buffers 316a-316n and thence in sequence to the full sense array raw data buffer 321. In response, the CPU 318 in the third thread 416 (and the DFB 325 in the second thread 408, respectively) may begin processing data from the current full sense array hardware scan time interval 414a during subsequent total time intervals 414b and 422b. The CPU 318 then provides a signal 419 to the first thread 402 to initiate the next full sense array hardware scan total time interval 414b. As a result, the next full sense array hardware scan total time interval 414b may be executed by the first thread 402 substantially concurrently with the DFB and CPU time intervals 414b and 422b executed by the second thread 408 and the third thread 416, respectively. As can be seen in FIG. 4, dead-time intervals in hardware time flow and CPU time flow are reduced to a minimum.

Figure 5:
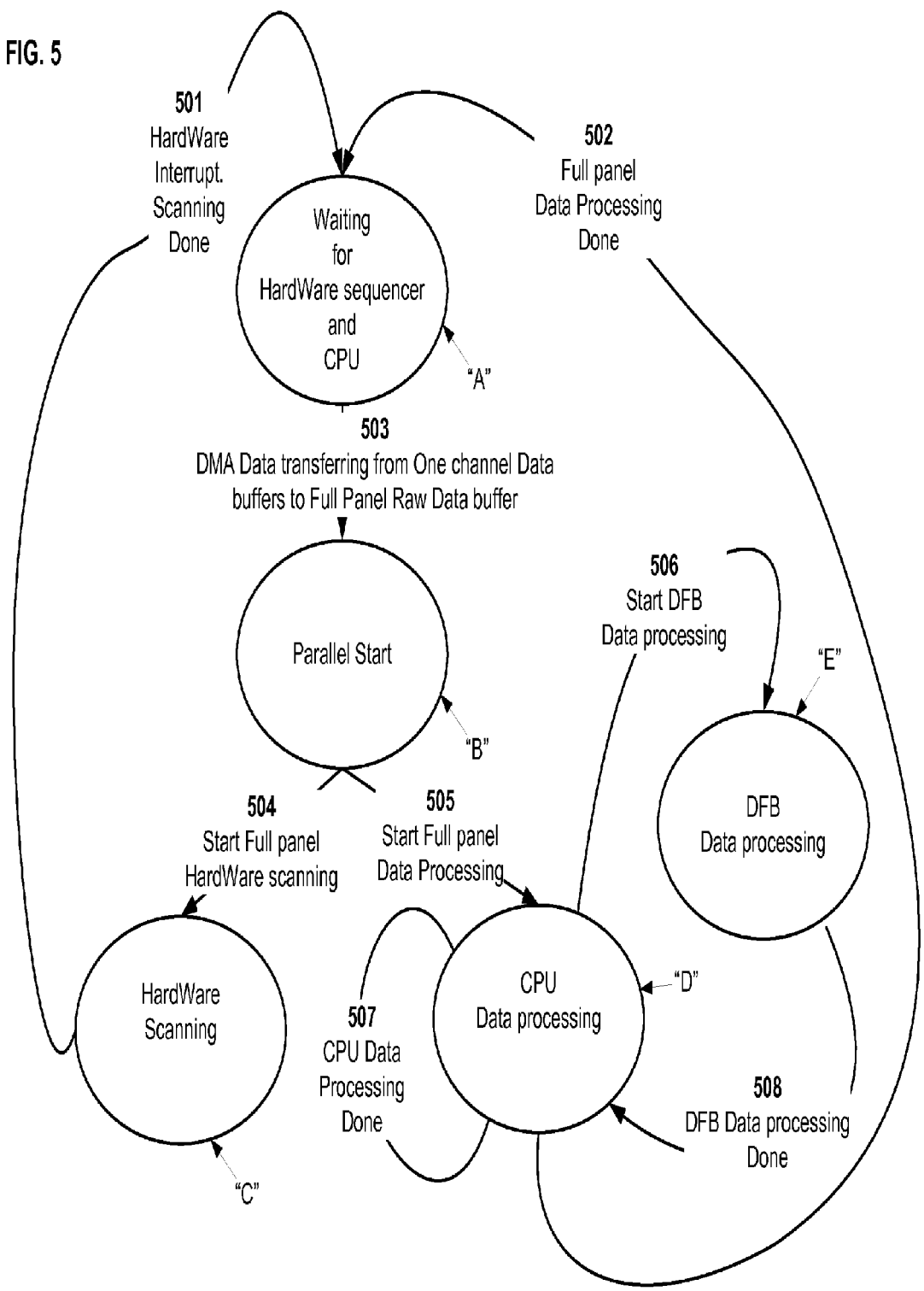
FIG. 5 is a state machine diagram configured to implement one embodiment of a method for operating the parallel pipelining touch sense controller of FIG. 3.

FIG. 5 is a state machine diagram configured to implement one embodiment of a method for operating the parallel pipelining touch sense controller of FIG. 3. Beginning in state A, the system 310 waits to receive indications from the sequencer 317 that a current full scan of response signals has been completed and a previous full scan of response signals has been processed and reported by the CPU 318, respectively. Upon receiving the indications on transitions 501, 502, respectively, the system 310, on transition 503, indicates to the sequencer 317 to instruct the DMA controller 319 to transfer the current full scan of response signals in the one channel scan data buffers 316a-316n to the full sense array raw data buffer 321 and then transitions to state B. All the scanned data is transferred to the full sense array raw data buffer 321, in the correct order, in very short time (30-90 μm). The separate full sense array raw data buffer 321 prevents coherence errors during simultaneous read-write access to the scan data. In state B, the system substantially simultaneously transitions, on transition 504, to state C wherein the next full scan of response signals is initiated and carried out by sequencer 317, and to state D on transition 505 where the current full scan of response signals stored in the full sense array raw data buffer 321 is processed by the CPU 318/DFB 325. In state D, the CPU 318 configures the DFB 325 on transition 506 to perform main data processing of the current full scan of response signals in state E. At substantially the same time, in state D, the CPU 318 performs additional service and data processing. When DFB 325 data processing of the current full scan of response signals has been completed in state E, the DFB 325 renders a touch map and transfers control on transition 508 to the CPU 318. If the CPU 318 data processing has been completed too (i.e., transition 507 has occurred), the system 310 exits state D on transition 502. When the sequencer 317 completes the next full scan of response signals, it generates an interrupt on transition 501, and the system 310 returns to state A. The sequence begins anew.

Figure 6:
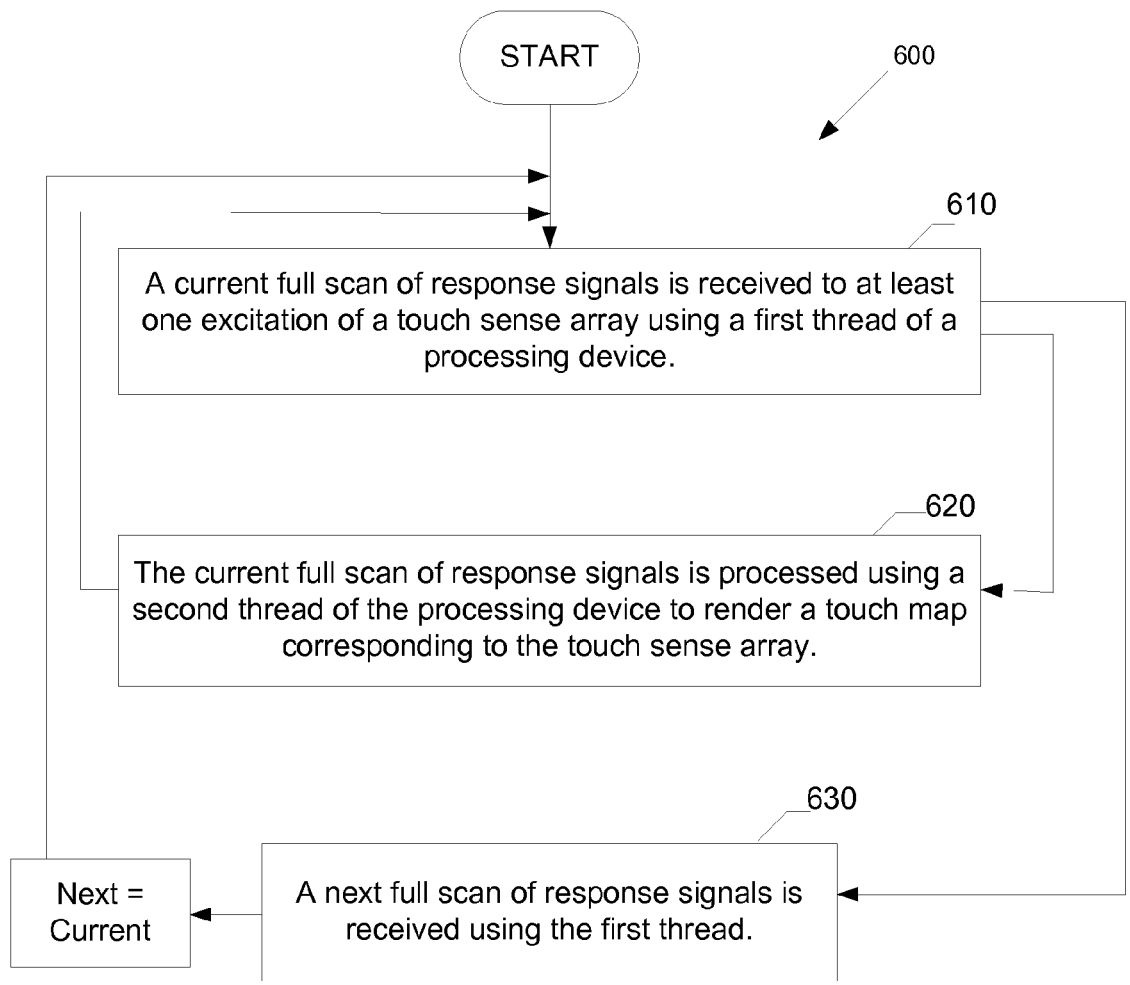
FIG. 6 is a process flow diagram of a method of operation of a touch sense controller for processing data into a touch map according to the state machine diagram of FIG. 5 and using the hardware of FIG. 3.

FIG. 6 is a process flow diagram of a method 600 of operation of a touch sense controller for processing data into a touch map according to the state machine diagram of FIG. 5 and using the hardware of FIG. 3. At block 610, a current full scan of response signals is received to at least one excitation of a touch sense array using a first thread of a processing device. In an embodiment, the first thread is a hardware scan thread of a sequencer and is not part of a central processing unit (CPU) of the processing device. At block 620, the current full scan of response signals is processed using a second thread of the processing device to render a touch map corresponding to the touch sense array. At block 630, a next full scan of response signals is received using the first thread. Receiving the next full scan and processing the current full scan are performed substantially simultaneously.

In an embodiment, second thread is a hardware thread of a digital filter block (DFB) and is not part of a CPU of the processing device. In another embodiment, the second thread is a software thread of a CPU of the processing device.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
receiving a current set of measurements of a touch sense array using a first functional block of a processing device;
processing the current set of measurements using a second functional block to render a touch map corresponding to the touch sense array; and
performing a next set of measurements of the touch sense array using the first functional block,
wherein the performing the next set of measurements and processing the current set of measurements are performed substantially concurrently.

2. The method of claim 1, wherein the first functional block is a sequencer and is not part of a central processing unit (CPU) of the processing device.

3. The method of claim 1, wherein the second functional block is a digital filter block (DFB) of the processing device and is not part of a central processing unit (CPU) of the processing device.

4. The method of claim 3, further comprising storing data, corresponding to individual slots of response signals of the current or next set of measurements, in corresponding buffers.

5. The method of claim 4, further comprising combining the data stored in the buffers into combined data to be stored in a full sense array raw data buffer in order of slots.

6. The method of claim 5, further comprising directly transferring the combined data in the full sense array raw data buffer to memory using direct memory access (DMA).

7. The method of claim 1, wherein the second functional block is a software thread of the CPU of the processing device.

8. The method of claim 1, wherein the first functional block is a first software thread of a central processing unit (CPU) of the processing device and the second functional block is a second software thread of the CPU.

9. The method of claim 1, wherein the processing the current set of measurements is initiated in response to receiving an interrupt corresponding to completion of receiving the current set of measurements.

10. The method of claim 1, wherein the performing the next set of measurements is initiated in response to receiving an interrupt corresponding to completion of processing of the current set of measurements.

11. A circuit comprising:
a first functional block configured to receive a current set of measurements of a touch sense array and configured to perform a next set of measurements of the touch sense array; and
a second functional block configured to process the current set of measurements to render a touch map corresponding to the touch sense array, wherein the next set of measurements is performed by the first functional block substantially concurrently with the second functional block processing the current set of measurements.

12. The circuit of claim 11, wherein the first functional block is a sequencer and is not part of a central processing unit (CPU).

13. The circuit of claim 11, wherein the second functional block is a digital filter block (DFB) of a processing device and is not part of a central processing unit (CPU).

14. The circuit of claim 11, wherein the first functional block and the second functional block share at least one common hardware element.

15. The circuit of claim 11, further comprising a central processing unit (CPU) configured to initiate processing the current set of measurements in response to an interrupt corresponding to completion of receiving the current set of measurements from the first functional block.

16. The circuit of claim 11, further comprising a central processing unit (CPU) configured to initiate processing the next set of measurements in response to an interrupt corresponding to completion of receiving the current set of measurements from the first functional block.

17. The circuit of claim 11, further comprising:
a memory; and
a direct memory access (DMA) controller coupled to the memory and the first functional block, wherein the DMA controller is configured to transfer data corresponding to individual response signals of the current or next set of measurements to corresponding buffers in the memory.

18. The circuit of claim 17, wherein the DMA controller is further configured to combine the buffers into a full sense array raw data buffer in order of slots in the memory.

19. An apparatus, comprising:
a processing device configured to detect a conductive object proximate to a touch sense array, wherein the processing device comprises:
a first functional block configured to receive a current set of measurements of a touch sense array and configured to perform a next set of measurements of the touch sense array; and
a second functional block configured to process the current set of measurements to render a touch map corresponding to the touch sense array,
wherein the next set of measurements is performed by the first functional block substantially concurrently with the second functional block processing the current set of measurements.

20. The apparatus of claim 19, wherein the first functional block and the second functional block are part of a central processing unit (CPU) of the processing device, wherein the receiving the current set of measurements and the performing the next set of measurements comprises executing a first software thread of the CPU, and wherein the processing the current set of measurements comprises processing the current set of measurements using a second software thread of the CPU.

* * * * *